United States Patent
Tofte

(10) Patent No.: US 9,604,351 B1
(45) Date of Patent: Mar. 28, 2017

(54) OIL FILTER REMOVAL AND DRAIN SYSTEM AND METHOD

(71) Applicant: Semor David Tofte, Campe Verde, AZ (US)

(72) Inventor: Semor David Tofte, Campe Verde, AZ (US)

(*) Notice: Subject to any disclaimer, the term of this patent is extended or adjusted under 35 U.S.C. 154(b) by 0 days.

(21) Appl. No.: 15/256,621

(22) Filed: Sep. 4, 2016

Related U.S. Application Data

(60) Provisional application No. 62/213,823, filed on Sep. 3, 2015.

(51) Int. Cl.
| | |
|---|---|
| B25B 13/28 | (2006.01) |
| B25B 27/00 | (2006.01) |
| B25B 13/34 | (2006.01) |
| B25B 13/40 | (2006.01) |
| B25B 13/32 | (2006.01) |
| B25B 13/44 | (2006.01) |

(52) U.S. Cl.
CPC .......... *B25B 27/0042* (2013.01); *B25B 13/28* (2013.01); *B25B 13/32* (2013.01); *B25B 13/34* (2013.01); *B25B 13/40* (2013.01); *B01D 2201/24* (2013.01); *B25B 13/44* (2013.01)

(58) Field of Classification Search
CPC ..... B25B 27/0042; B25B 13/10; B25B 13/28; B25B 13/30; B25B 13/32; B25B 13/34; B25B 13/40; B25B 13/44; B25B 13/5016; B01D 2201/24
USPC ....... 81/90.1, 90.2, 90.9, 111–118, 3.4–3.44, 81/3.48; 141/330
See application file for complete search history.

(56) References Cited

U.S. PATENT DOCUMENTS

| | | |
|---|---|---|
| 1,996,550 A | 4/1933 | Sampson et al. |
| 3,385,141 A | 5/1968 | Norman |
| 3,853,026 A | 12/1974 | Rhodes |
| 4,177,529 A * | 12/1979 | Sikula, Jr. ............. B01D 27/00 141/330 |
| 4,266,452 A | 5/1981 | Crist |
| 4,776,431 A | 10/1988 | Poling |
| 4,781,084 A | 11/1988 | Steen et al. |
| 4,865,727 A | 9/1989 | Krauss |
| 4,867,017 A | 9/1989 | Holman |
| 5,065,648 A | 11/1991 | Hocfbaum et al. |
| 5,271,299 A | 12/1993 | Wadsworth |
| 5,377,565 A | 1/1995 | Mangum |
| 5,386,748 A | 2/1995 | Kilgore |

(Continued)

*Primary Examiner* — Bryan R Muller
(74) *Attorney, Agent, or Firm* — Integrity Patent Group, PLC; Edwin Wold

(57) ABSTRACT

An oil filter removal and drain system including an oil-filter-removal assembly and a drain-attachment assembly in functional combination. The oil-filter-removal assembly includes a top-frame, a bottom-frame, a geared-socket-hub, a filter-socket, a plurality of geared-clamp-jaws, a filter-gasket, and a toggle-clamp in functional and structural combination. The drain-attachment assembly includes a drain-attachment-body, a drain-toggle-clamp, a drain-nipple, and a filter-cutter. The drain-attachment assembly is removably affixable to the oil-filter-removal assembly via the plurality keyhole-stud-receivers of the drain-attachment assembly accepting and retaining the plurality of keyhole-studs of the oil-filter-removal assembly. An oil-filter-removal assembly may be used on many different types of fluid filters (e.g., hydraulic fluid, diesel fuel, engine oil, etc.).

18 Claims, 7 Drawing Sheets

(56) References Cited

U.S. PATENT DOCUMENTS

| | | | |
|---|---|---|---|
| 5,421,223 A | 6/1995 | Wawrzyniak | |
| 5,440,957 A | 8/1995 | Rogers | |
| 5,469,935 A | 11/1995 | Hewuse | |
| 5,722,508 A | 3/1998 | Kraus | |
| 5,924,342 A | 7/1999 | Chou | |
| 5,974,916 A | 11/1999 | Lassiter | |
| 6,227,078 B1 | 5/2001 | Lemmo, Jr. | |
| 6,769,516 B2 | 8/2004 | Carlson | |
| 7,107,878 B1 | 9/2006 | Jerantowski | |
| 7,241,385 B1 | 7/2007 | Cline | |
| 7,340,979 B2 | 3/2008 | Sawyer | |
| 8,002,002 B2 * | 8/2011 | Knoll | B01D 35/30 137/318 |
| 8,950,298 B2 * | 2/2015 | Yang | F01M 11/03 81/128 |
| 9,193,050 B2 * | 11/2015 | Chen | B25B 27/0042 |
| 9,403,263 B2 * | 8/2016 | Lai | B25B 27/0042 |
| 2012/0079919 A1 * | 4/2012 | Chen | B25B 27/0042 81/90.2 |
| 2013/0206244 A1 | 8/2013 | Laurel | |
| 2014/0144297 A1 | 5/2014 | Antonio | |

\* cited by examiner

OIL FILTER REMOVAL AND DRAIN SYSTEM AND METHOD

CROSS-REFERENCE TO RELATED APPLICATION

The present application is related to and claims priority from prior provisional application Ser. No. 62/213,823, filed Sep. 3, 2015 which application is incorporated herein by reference.

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of automobiles and more specifically relates to oil filter removal devices.

2. Description of Related Art

An oil filter is a filter device to remove particulate contaminants from engine oil, transmission oil, lubricating oil, hydraulic oil, or other similar fluid lubricants. Most times the use of the oil filter is for internal combustion engines installed within in motor vehicles, light aircraft, and boats. Other hydraulic systems can also be equipped with a filter. Aside from these uses, oil production, transport, and recycling facilities also employ filters in the manufacturing process.

Oil and/or other lubricant filters may removable and include replaceable internal filtration components, in other instances filters may be a complete unit such that the filter is removed and disposed of completely. Such filters can include the "spin-on" type such that the filter includes threads to affix the filter to the device in which the fluid/lubricant is intended to be filtered.

Generally, an oil-filter wrench, strap, or similar device can be used to remove a spin-on type oil filter. These types of filters can be smooth and cylindrical with knurling or flat surfaces on the bottom edge that can be difficult to grip, especially when they are dirty, oily, or damaged. Also, most filter wrenches are specific to a particular size or style of filter. In many cases the filter may contain oil during removal. Such conditions may make it difficult for a maintenance technician to remove the filter without spilling the lubricant, oil, or fuel. It is advantageous, in some instances to drain the residual fluid from a filter prior to the removal of the filter. Based upon the need to remove the lubricant from a filter and the variability in filter sizes, a suitable device is desired.

Several attempts have been made to solve the above-mentioned problems such as those found in U.S. Pat. No. 1,996,550 to Sampson et al.; U.S. Pat. No. 3,385,141 to Norman; U.S. Pat. No. 3,853,026 to Rhodes; U.S. Pat. No. 4,266,452 to Crist; U.S. Pat. No. 4,776,431 to Poling; U.S. Pat. No. 4,781,084 to Steen et al.; U.S. Pat. No. 4,865,727 to Kraus; U.S. Pat. No. 4,867,017 to Holman; U.S. Pat. No. 5,065,648 to Hocfbaum et al.; U.S. Pat. No. 5,271,299 to Wadsworth; U.S. Pat. No. 5,377,565 to Mangum; U.S. Pat. No. 5,386,748 to Kilgore; U.S. Pat. No. 5,421,233 to Wawrzyniak; U.S. Pat. No. 5,440,957 to Kraus; U.S. Pat. No. 5,469,935 to Hewuse; U.S. Pat. No. 5,440,957 to Rogers; U.S. Pat. No. 5,924,342 to Chou; U.S. Pat. No. 5,974,916 to Lassiter; U.S. Pat. No. 6,227,078 to Lemmo, Jr.; U.S. Pat. No. 6,769,516 to Carlson; U.S. Pat. No. 7,107,878 to Jerantowski; U.S. Pat. No. 7,241,385 to Cline; U.S. Pat. No. 7,340,979 to Sawyer; U.S. Pat. No. 8,002,002 to Knoll; 2013/0206244 to Laurel; and 2014/0144297 to Antonio. This art is representative of oil filter tools. However, none of the above inventions and patents, taken either singly or in combination, is seen to describe the invention as claimed.

BRIEF SUMMARY OF THE INVENTION

In view of the foregoing disadvantages inherent in the known oil filter removal devices art, the present invention provides a novel oil filter removal and drain system and method. The general purpose of the present invention, which will be described subsequently in greater detail is to provide a device to aid a user in the removal of fluid filters of varying sizes while additionally including a way for the user to drain the oil or other fluid from the filter prior to removing the filter.

An oil filter removal and drain system is disclosed herein, in a preferred embodiment, comprising an oil-filter-removal assembly, and a drain-attachment assembly in functional combination. The oil-filter-removal assembly comprises a top-frame, a bottom-frame, a geared-socket-hub, a filter-socket, a plurality of geared-clamp-jaws, a filter-gasket, and a toggle-clamp in functional and structural combination. The drain-attachment assembly comprises a drain-attachment-body, a drain-toggle-clamp, a drain-nipple, and a filter-cutter in functional and structural combination.

The drain-attachment assembly is removably affixable to the oil-filter-removal assembly via the plurality keyhole-stud-receivers of the drain-attachment assembly accepting and retaining the plurality of keyhole-studs of the oil-filter-removal assembly. The toggle-clamp also includes an adjustment-screw to provide for a more fine adjustment of the oil-filter-removal assembly to accommodate a plurality of sizes of oil-filters. Filter-socket includes a filter-socket-seal to prevent leakage of oil from between the drain-attachment assembly and the oil-filter-removal assembly during use. An oil-filter-removal assembly may be used on many different types of fluid filters (e.g., hydraulic fluid, diesel fuel, engine oil, etc.).

The top-frame of the oil-filter-removal assembly comprises a top-frame-body and a top-frame, with the bottom-frame of the oil-filter-removal assembly comprising a bottom-frame-body, a bottom-frame-aperture, and a plurality of keyhole-studs, all in functional and structural combination.

The oil-filter-removal assembly is structured and arranged to be adjustably affixable to an oil-filter (or other fluid filter) such that the user may remove the filter from an engine or other article of machinery. Each of the geared-clamp-jaws comprises at least one gripping-finger, with each of the geared-clamp-jaws structured and arranged to grip an outside-surface of the oil-filter. The top-frame, the bottom-frame, the geared-socket-hub, and the toggle-clamp are structured and arranged to provide the user with the ability to adjust the orientation of the plurality of geared-clamp-jaws to removably grip a plurality of sizes of oil-filters to aid in removal of the oil-filters by pressing the toggle-clamp to adjust the orientation of the plurality of geared-clamp-jaws. Each of the gripping-fingers of each of the plurality of geared-clamp-jaws includes a textured surface to increase grippability between the oil-filter-removal assembly and the oil-filter. The filter-socket is structured and arranged to allow the user to removably affix a socket-wrench to the oil-filter-removal assembly to increase torque on the oil-filter during removal of the oil-filter.

The drain-attachment is structured and arranged to puncture the oil-filter via the filter-cutter providing the user with an ability to drain oil from the oil-filter prior to removing the oil-filter from the engine or other machine. Each of the bottom-frame-aperture and each of the top-frame-aperture are structured and arranged to allow the filter-cutter to pass through the oil-filter-removal assembly to contact the oil-filter. Embodiments of filter-cutters are constructed from a hardened-material to provide increased durability such that the filter-cutter is able to maintain adequate sharpness over a usable lifetime.

An embodiment of oil filter removal and drain system further comprises a drain-bracket to removably affix the oil-filter to an oil-vessel to provide complete draining of oil from the oil-filter. Another embodiment of oil filter removal and drain system additionally comprises a drain-tube removably affixable to the drain-nipple of the drain-attachment assembly to controllably direct the oil from the oil-filter into the oil-vessel, with the drain-nipple being removable and replaceable such that the user may replace the drain-nipple with one of a different size to accommodate multiple sizes of drain-tubes. Embodiments also include a tubing-clamp structured and arranged to allow the user to selectively stop the flow of oil through the drain-tube.

According to an embodiment, a method for using an oil filter removal and drain system is also disclosed herein. The method for using an oil filter removal and drain system includes the steps of: providing the oil filter removal and drain system, providing a replacement-oil-filter for an engine, adjusting the oil-filter-removal assembly to affix to the replacement oil-filter, draining oil from the engine, placing the oil-filter-removal assembly upon an oil-filter of the engine, pressing a toggle-clamp of the oil-filter-removal assembly to secure the oil-filter-removal assembly to the oil-filter of the engine, loosening the oil-filter of the engine by affixing a socket-wrench to the oil-filter-removal assembly and rotating the oil-filter-removal assembly, affixing a drain-attachment assembly to the oil-filter-removal assembly and a drain-tube to the drain-attachment assembly, pressing a drain-toggle-clamp of the drain-attachment assembly, and opening the tubing-clamp. Additional steps of the method of use include directing oil draining from the oil-filter into an oil-vessel via the drain-tube, removing the drain-attachment assembly from the oil-filter-removal assembly, removing the oil-filter-removal assembly from the oil-filter of the engine, removing the oil-filter from the engine, and placing the oil-filter upon the drain-bracket to allow the oil-filter to fully drain.

The present invention holds significant improvements and serves as an oil filter removal and drain system. Preferably, an oil filtration removal devices should provide a device to drain oil from a filter and remove the filter, with the capability to accommodate a wide variety of sizes of filters and, yet would operate reliably and be manufactured at a modest expense. Thus, a need exists for a reliable oil filter removal and drain system to avoid the above-mentioned problems.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present disclosure, an oil filter removal and drain system and method, constructed and operative according to the teachings of the present disclosure.

The various embodiments of the present invention will hereinafter be described in conjunction with the appended drawings, wherein like designations denote like elements.

DETAILED DESCRIPTION

Figure 1:
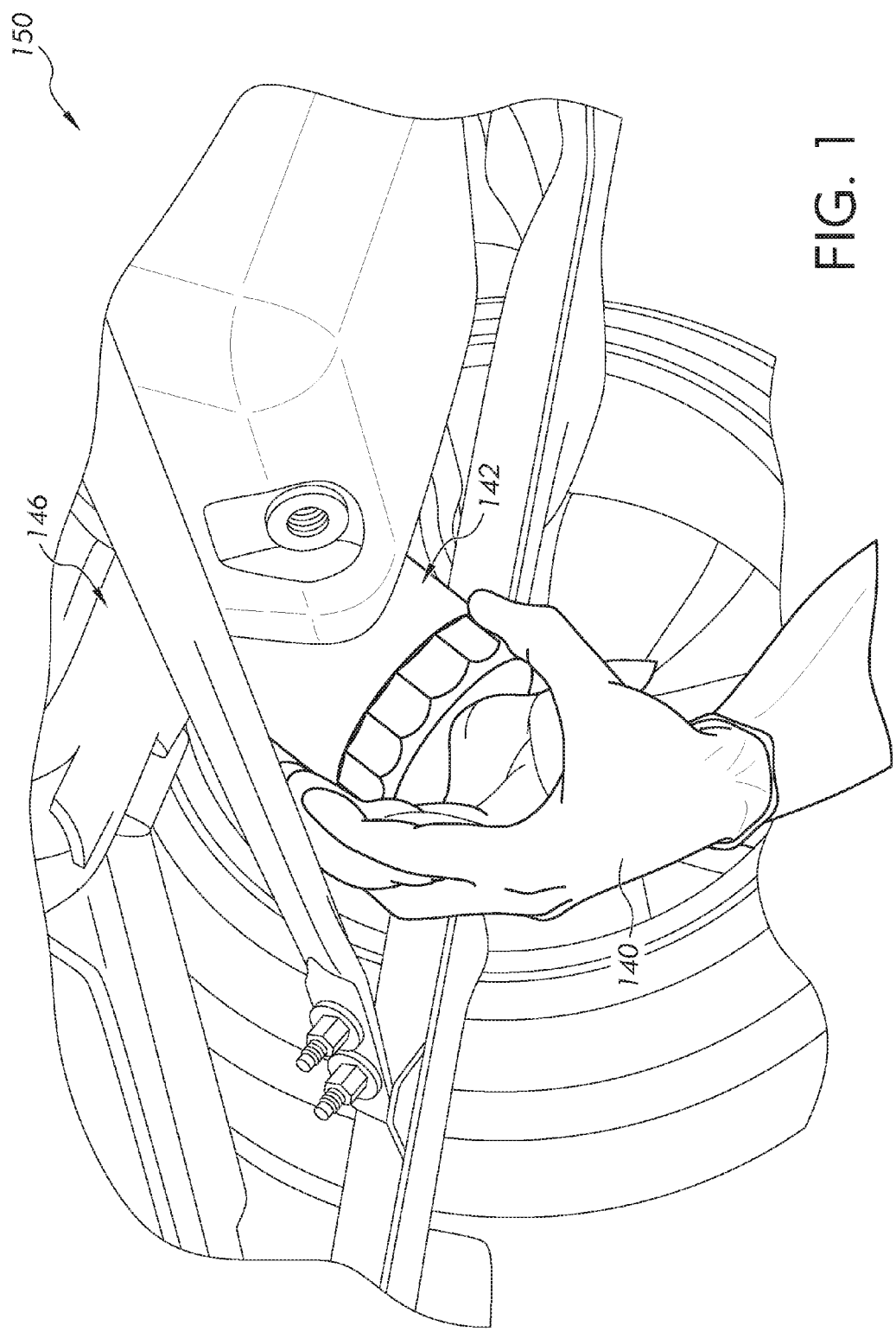
FIG. 1 shows a perspective view illustrating a user removing an oil filter from an engine according to an embodiment of the disclosure.

As discussed above, embodiments of the present disclosure relate to a oil filter removal devices and more particularly to an oil filter removal and drain system as used to improve the draining of oil from a filter as well as the removal of the filter.

Generally speaking, an oil filter removal and drain system is two piece tool for removing an fluid filter, such as oil filter which has a filter socket with adjustable jaws placed around a frame equipped with a drive socket and a drain attachment to pierce the filter body and control the oil flow. The filter socket jaws are mounted on gears surrounding a pinion. One gear attached to an integral toggle clamp rotates the pinion which then rotates the other gears to synchronously close or open all jaws around the filter body.

Keyhole studs hold the drain attachment that has an integral handle to pierce the filter body. Waste oil flows through the center of the drive socket and out tubing to a waste receptacle. The tool may be left on the engine to drain the oil or removed as an assembly to drain the oil away from the engine. An extracting pump may be attached to the drain to reduce draining time. This compact tool set consists of multiple synchronized jaws operated by an adjustable toggle clamp and a companion oil draining device. The jaws center the socket on the cartridge while applying a vise-like grip. The tool has a small axial footprint and can be installed and operated with one hand.

The only shop tool needed to operate the device is a standard socket wrench. After the socket is clamped to the filter the oil draining device may be attached to the socket. A punch integral to the drain device is deployed to pierce the filter shell. A flexible hose and valve directs the released oil to a remote drain container.

Referring now more specifically to the drawings by numerals of reference there is shown in FIGS. 1-4, various views of an oil filter removal and drain system 100 according to embodiments of the present disclosure. An oil filter removal and drain system 100 may comprise oil-filter-removal assembly 104, drain-attachment assembly 200, and drain-tube 224. Drain-tube 224 may include a tubing-clamp. Oil-filter-removal assembly 104 is structured and arranged to be adjustably affixable to oil-filter 142 such that user 140 may remove oil-filter 142 from engine 146 (or other machinery). Embodiments of oil filter and drain system 100 may additionally include a drain-bracket to removably affix oil-filter 142 to an oil-vessel (e.g. oil pan, drum, barrel, etc.) to provide complete draining of oil from oil-filter 142.

Figure 2A:
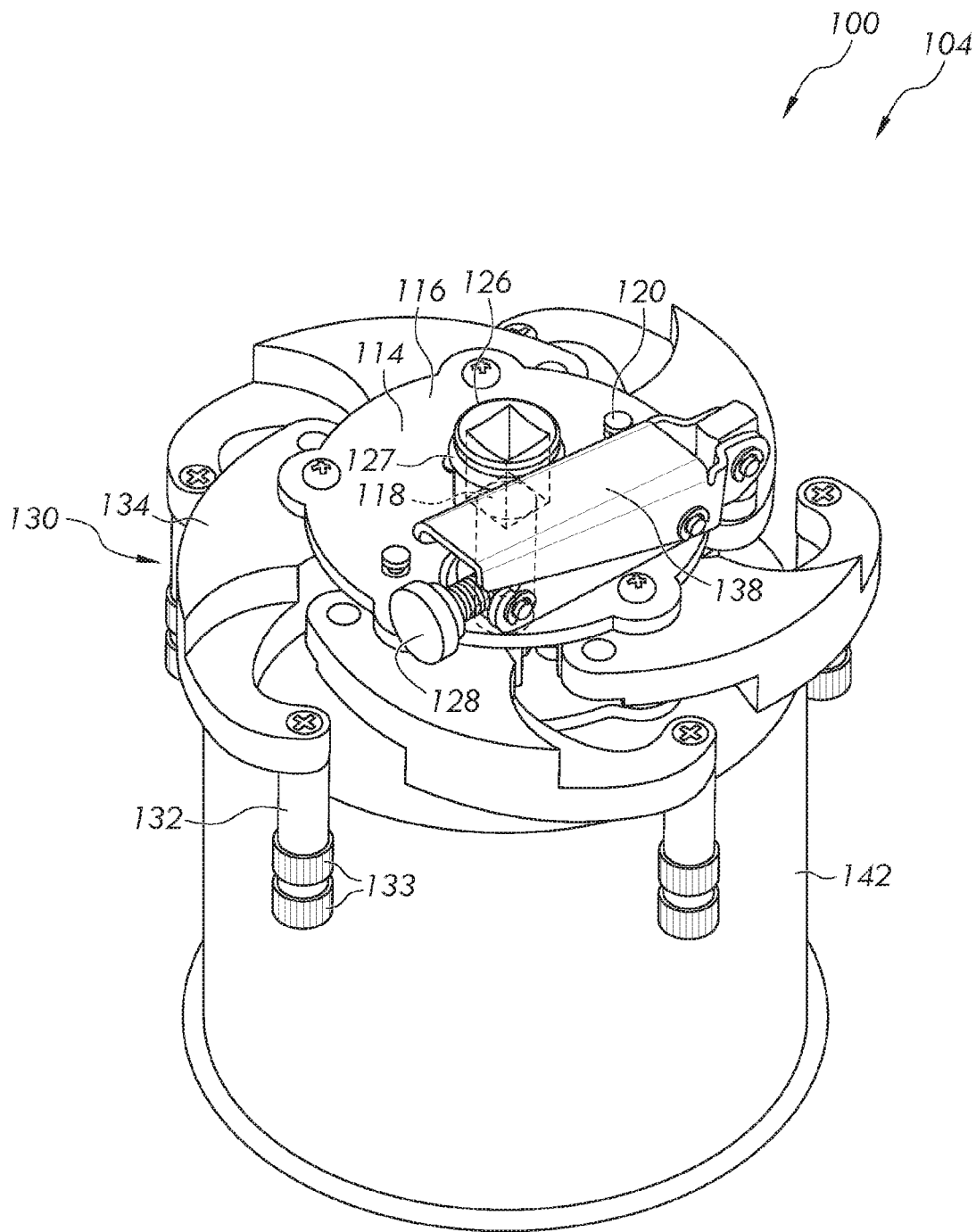
FIG. 2A is a bottom-side view illustrating the oil filter removal and drain system comprising a oil-filter-removal assembly according to an embodiment of the present invention of the disclosure.
Figure 2B:
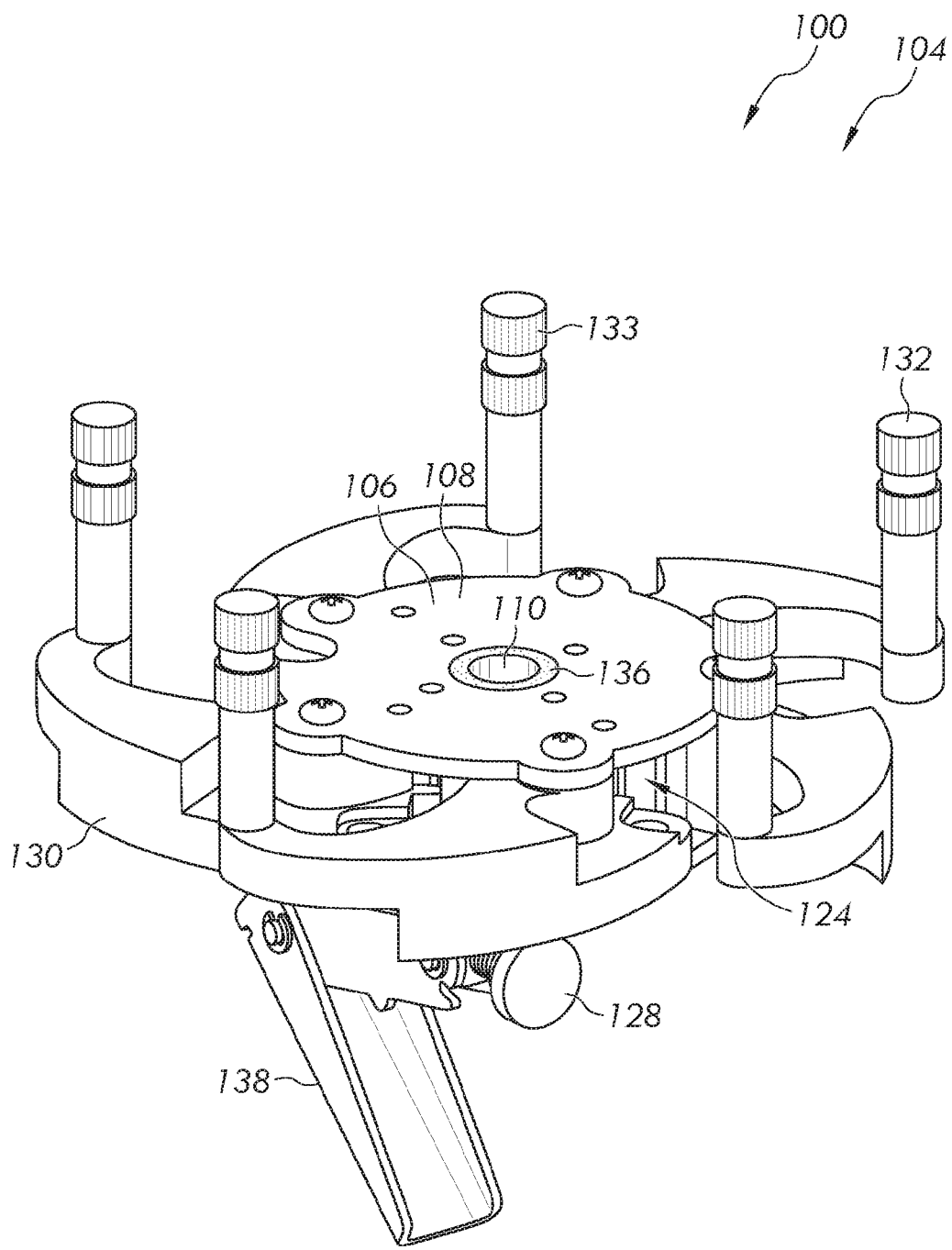
FIG. 2B is a top-side view illustrating the oil filter removal and drain system comprising a oil-filter-removal assembly according to an embodiment of the present invention of the disclosure.

Referring to FIGS. 2A and 2B, oil-filter-removal assembly 104 may comprise top-frame 106, bottom-frame 114, geared-socket-hub 124, filter-socket 126, plurality of geared-clamp-jaws 130, filter-gasket 136, and toggle-clamp 138. Top-frame 106 may comprise top-frame-body 108 and top-frame-aperture 110. Bottom-frame 114 may comprise bottom-frame-body 116, bottom-frame-aperture 118, and plurality of keyhole-studs 120. Plurality of geared-clamp-jaws 130 may comprise at least one gripping-finger 132 and geared-clamp-jaw-base 134. Top-frame 106, bottom-frame 114, geared-socket-hub 124, and toggle-clamp 138 may be structured and arranged to provide user 140 with the ability to adjust the orientation of plurality of geared-clamp-jaws 130 to removably grip a plurality of shapes and/or sizes of oil-filters 142 to aid in removal of oil-filter 142 by pressing toggle-clamp 138 to adjust orientation of plurality of geared-clamp-jaws 130.

Geared-clamp-jaws 130 may structured and arranged to grip an outside-surface of oil-filter 142. Each gripping-finger 132 of each geared-clamp-jaw 130 may further include textured surface 133 to increase grippability between oil-filter-removal assembly 104 and oil-filter 142. Some embodiments may include two gripping-fingers 132 for each geared-clamp-jaw 130 to provide greater grippability upon oil-filter during use 142.

Toggle-clamp 138 may further include adjustment-screw 128 to provide for a more fine adjustment of oil-filter-removal assembly 104 to accommodate plurality of sizes of oil-filters 142. Toggle-clamp 138 may also include a rubberized texture to increase grippablity during use, in some embodiments. Filter-socket 126 is structured and arranged to allow user to removably affix a socket-wrench to oil-filter-removal assembly 104 to increase torque on oil-filter 142 during removal of oil-filter 142.

Figure 3A:
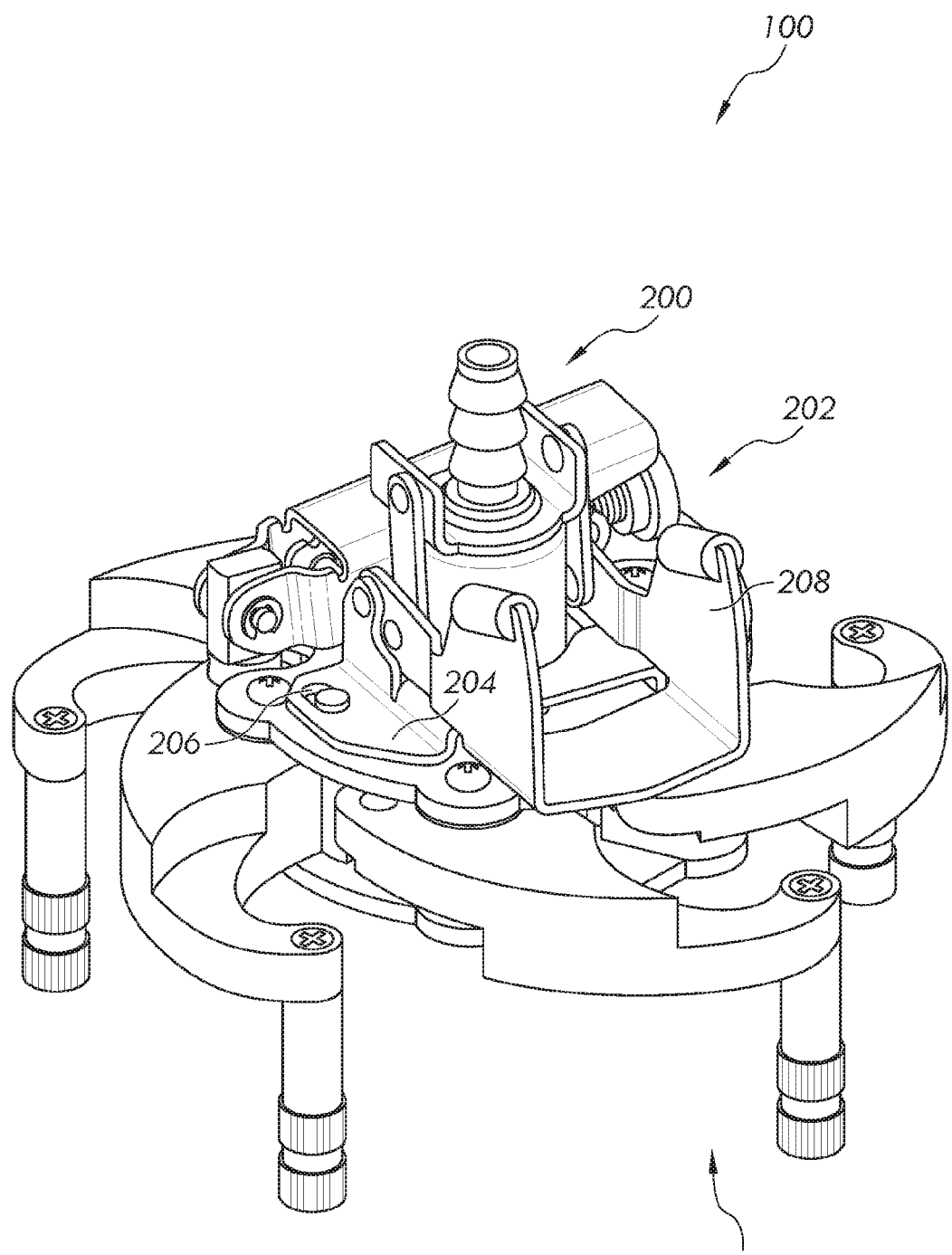
FIG. 3A is a bottom-side perspective view illustrating the drain-attachment assembly affixed to the oil-filter-removal assembly according to an embodiment of the present disclosure.
Figure 3B:
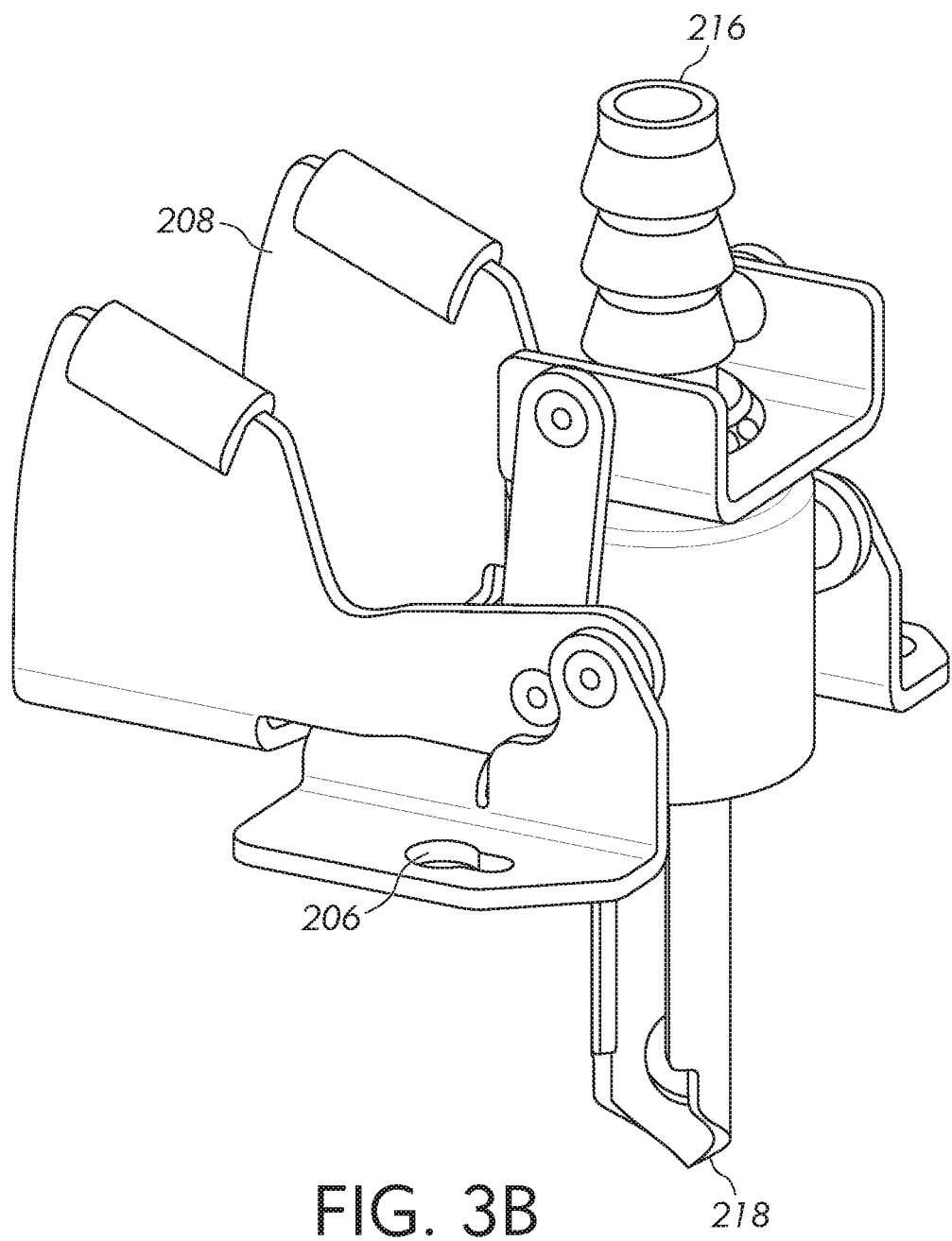
FIG. 3B is a perspective view illustrating the drain-attachment assembly separated from the oil-filter-removal assembly according to an embodiment of the present disclosure.

As shown in FIGS. 3A and 3B, drain-attachment assembly 200 may comprise drain-attachment-body 202, drain-toggle-clamp 208, drain-nipple 216, and filter-cutter 218. Filter-socket 126 may further include filter-socket-seal 127 (shown in FIG. 2A) to prevent leakage of oil from between drain-attachment assembly 200 and oil-filter-removal assembly 104 during use. Drain-attachment assembly 200 is structured and arranged to puncture oil-filter 142 via filter-cutter 218, providing user 140 with the ability to drain oil from oil-filter 142 prior to removing oil-filter 142 from engine 146. Embodiments may include drain-toggle-clamp 208 comprising a rubberized texture to increase grippablity during use.

Figure 4:
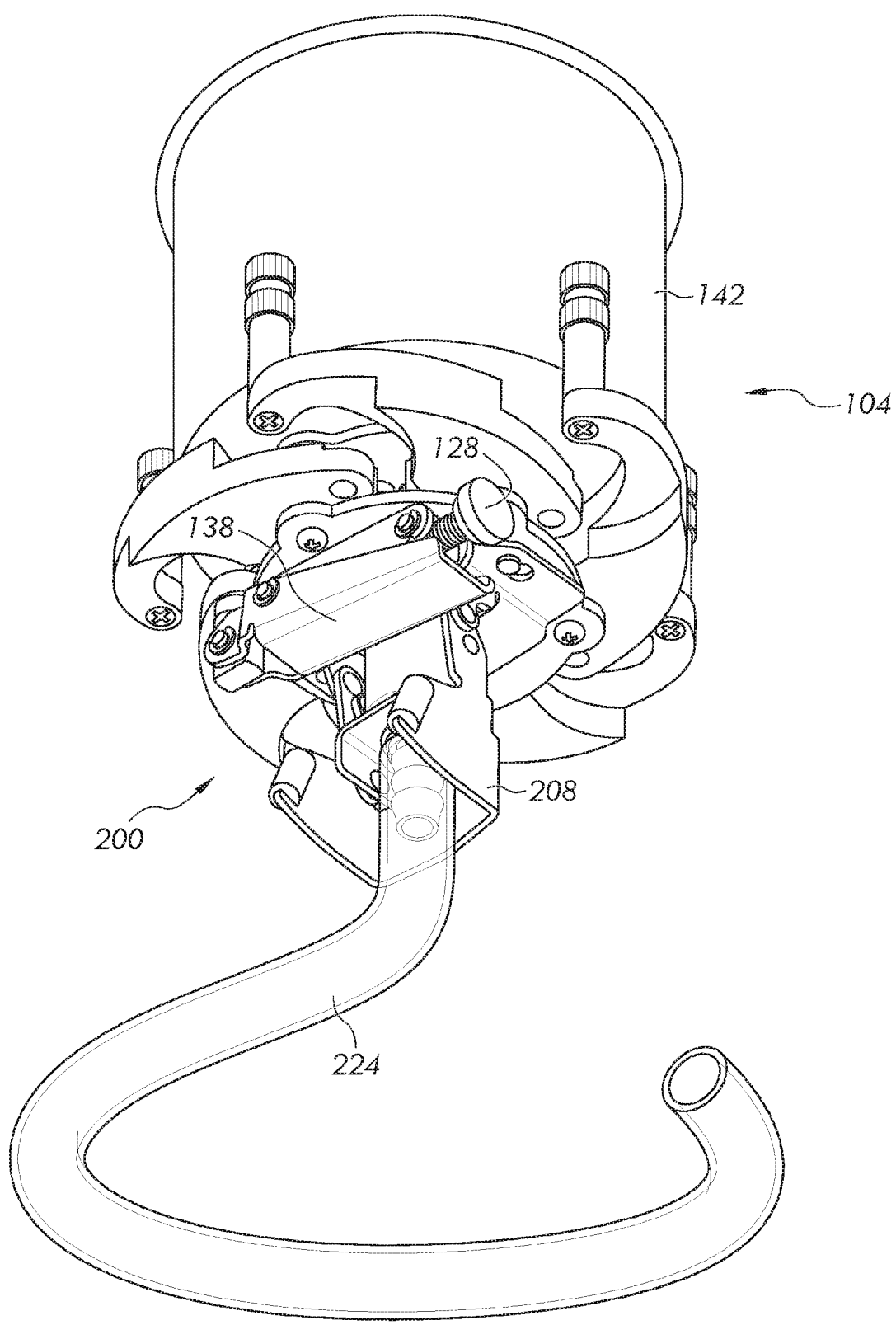
FIG. 4 is a bottom view illustrating an oil filter removal and drain system with a drain-tube affixed according to an embodiment of the present disclosure.

As can be seen in FIGS. 3A and 4, drain-attachment assembly 200 may be removably affixable to oil-filter-removal assembly 104 via plurality keyhole-stud-receivers 206 of drain-attachment assembly 200 accepting and retaining plurality of keyhole-studs 120 of oil-filter-removal assembly 104. Also, oil filter removal and drain system 100 may further comprise drain-tube 224 removably affixable to drain-nipple 216 of drain-attachment assembly 200 to controllably direct the oil from oil-filter 142 into an oil-vessel.

Drain-nipple 216 may be removable and replaceable such that user 140 may replace drain-nipple 216 with one of a different size to accommodate multiple sizes of drain-tube 224. Drain-tube 224 may comprise a tubing-clamp structured and arranged to allow user 140 to selectively stop a flow of oil through drain-tube 224. Bottom-frame-aperture 118 and top-frame-aperture 110 are structured and arranged to allow filter-cutter 218 to pass through oil-filter-removal assembly 104 to contact oil-filter 142.

In some embodiments oil-filter-removal assembly 104 may be constructed from a stainless-steel material to provide corrosion resistance and durability during use, other embodiments may include oil-filter-removal assembly 104 constructed from a ferrous-metallic material to provide increased strength and durability during use. Similarly, drain-attachment 200 assembly may be constructed from a stainless-steel material to provide corrosion resistance and durability during use, or may be constructed from ferrous-metallic material.

Oil filter removal and drain system 100 may be sold as a kit comprising the following parts: at least one oil-filter-removal assembly 104; at least one drain-attachment assembly 200; at least one drain-bracket; at least one drain-tube 224; at least one tubing-clamp; and at least one set of user instructions. The kit has instructions such that functional relationships are detailed in relation to the structure of the invention (such that the invention can be used, maintained, or the like in a preferred manner).

Oil filter removal and drain system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different combinations, parts may be sold separately, etc., may be sufficient.

Figure 5:
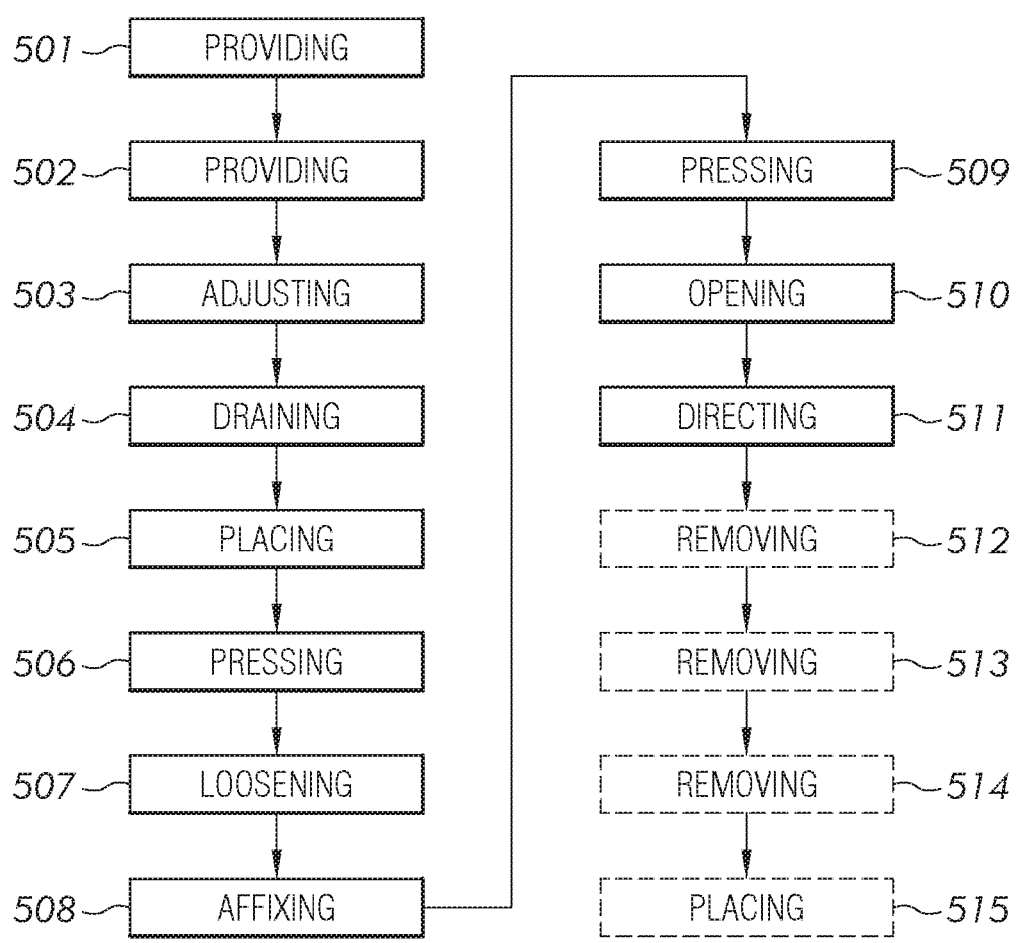
FIG. 5 is a flow diagram illustrating a method of use for an oil filter removal and drain system according to an embodiment of the present disclosure.

Referring now to FIG. 5 showing a diagram illustrating a method of use for oil filter removal and drain system 100 according to an embodiment of the present invention of FIGS. 1-4. As shown, method of use 500 may comprise the steps of: step one 501, providing oil filter removal and drain system 100; step two 502, providing a replacement-oil-filter for engine 146; step three 503, adjusting oil-filter-removal assembly 104 to affix to the replacement oil-filter step; four 504, draining oil from engine 146; step five 505, placing oil-filter-removal assembly 104 upon oil-filter 142 of the engine 146; step six 506, pressing toggle-clamp 138 of oil-filter-removal assembly 104 to secure oil-filter-removal assembly 104 to oil-filter 142 of engine 146; step seven 507, loosening oil-filter 142 of engine 146 by affixing a socket-wrench to oil-filter-removal assembly 104 and rotating oil-filter-removal assembly 104; step eight 508, affixing drain-attachment assembly 200 to oil-filter-removal assembly 104 and drain-tube 224 to drain-attachment assembly 200; step nine 509, pressing drain-toggle-clamp 208 of drain-attachment assembly 200; step ten 510, opening a tubing-clamp; step eleven 511, directing oil draining from oil-filter 142 into an oil-vessel via drain-tube 224; step twelve 512, removing drain-attachment assembly 200 from oil-filter-removal assembly 104; step thirteen, 513 removing oil-filter-removal assembly 104 from oil-filter 142 of engine 146; step fourteen 514, removing oil-filter 142 from engine 146; and step fifteen 515, placing oil-filter 142 upon a drain-bracket to allow oil-filter 142 to fully drain.

It should be noted that steps eleven through fifteen (511, 512, 513, 514, and 515) are optional steps and may not be implemented in all cases. Optional steps of method of use 500 are illustrated using dotted lines in FIG. 5 so as to distinguish them from the other steps of method of use 500.

It should be noted that the steps described in the method of use can be carried out in many different orders according to user preference. The use of "step of" should not be interpreted as "step for", in the claims herein and is not intended to invoke the provisions of 35 U.S.C. §112 (f). Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. An oil filter removal and drain system comprising:
   an oil-filter-removal assembly comprising;
      a top-frame comprising;
         a top-frame-body; and
         a top-frame-aperture;
      a bottom-frame comprising;
         a bottom-frame-body;
         a bottom-frame-aperture; and
         a plurality of studs;
      a geared-socket-hub;
      a filter-socket;
      a plurality of geared-clamp-jaws comprising;
         at least one gripping-finger; and
         a geared-clamp-jaw-base;
      a filter-gasket; and
      a toggle-clamp; and
   a drain-attachment assembly comprising;
      a drain-attachment-body comprising;
         a drain-attachment-base; including
            a plurality of keyhole-stud-receivers;
         a drain-toggle-clamp;
         a drain-nipple; and
         a filter-cutter;
   wherein said oil filter removal and drain system comprises said oil-filter-removal assembly, and said drain-attachment assembly in functional combination;
   wherein said top-frame, said bottom-frame, said geared-socket-hub, and said toggle-clamp are structured and arranged to provide a user with the ability to adjust the orientation of said plurality of geared-clamp-jaws to removably grip a plurality of sizes of oil-filters to aid in removal of said oil-filters by pressing said toggle-clamp to adjust said orientation of said plurality of geared-clamp-jaws;
   wherein said filter-socket is structured and arranged to allow said user to removably affix a socket-wrench to said oil-filter-removal assembly to increase torque on said oil-filter during removal of said oil-filter;
   wherein each of said geared-clamp-jaws is structured and arranged to grip an outside-surface of said oil-filter;
   wherein said drain-attachment assembly is removably affixable to said oil-filter-removal assembly via said plurality keyhole-stud-receivers of said drain-attachment assembly accepting and retaining said plurality of studs of said oil-filter-removal assembly;
   wherein each of said bottom-frame-aperture and said top-frame-aperture are structured and arranged to allow said filter-cutter to pass through said oil-filter-removal assembly to contact said oil-filter;
   wherein said oil-filter-removal assembly is structured and arranged to be adjustably affixable to said oil-filter such that a user may remove said oil-filter from an engine; and
   wherein said drain-attachment is structured and arranged to puncture said oil-filter via said filter-cutter providing said user with an ability to drain oil from said oil-filter prior to removing said oil-filter from said engine.

2. The oil filter removal and drain system of claim 1 wherein said toggle-clamp further includes an adjustment-screw to provide for a more fine adjustment of said oil-filter-removal assembly to accommodate said plurality of sizes of oil-filters.

3. The oil filter removal and drain system of claim 1 further comprising a drain-tube removably affixable to said drain-nipple of said drain-attachment assembly to controllably direct said oil from said oil-filter into an oil-vessel.

4. The oil filter removal and drain system of claim 3 wherein said drain-nipple is removable and replaceable such that said user may replace said drain-nipple with one of a different size to accommodate multiple sizes of said drain-tube.

5. The oil filter removal and drain system of claim 3 wherein said drain-tube further comprises a tubing-clamp structured and arranged to allow said user to selectively stop a flow of oil through said drain-tube.

6. The oil filter removal and drain system of claim 1 wherein each of said gripping-fingers of each of said plurality of geared-clamp-jaws further include a textured surface to increase grippability between said oil-filter-removal assembly and said oil-filter.

7. The oil filter removal and drain system of claim 1 wherein said filter-socket further includes a filter-socket-seal to prevent leakage of oil from between said drain-attachment assembly and said oil-filter-removal assembly during use.

8. The oil filter removal and drain system of claim 1 wherein each of said geared-clamp-jaws includes two gripping-fingers to provide a greater grippability upon said oil-filter during use.

9. The oil filter removal and drain system of claim 1 wherein said filter-cutter is constructed from a hardened-material.

10. The oil filter removal and drain system of claim 1 wherein said oil-filter-removal assembly is constructed from a stainless-steel material.

11. The oil filter removal and drain system of claim 1 wherein said drain-attachment assembly is constructed from a stainless-steel material.

12. The oil filter removal and drain system of claim 1 wherein said oil-filter-removal assembly is constructed from a ferrous-metallic material.

13. The oil filter removal and drain system of claim 1 wherein said drain-attachment assembly is constructed from a ferrous-metallic material.

14. The oil filter removal and drain system of claim 1 wherein said toggle-clamp includes a rubberized texture to increase grippablity during use.

15. The oil filter removal and drain system of claim 1 wherein said drain-toggle-clamp includes a rubberized texture to increase grippablity during use.

16. An oil filter removal and drain system comprising:
an oil-filter-removal assembly comprising;
a top-frame comprising;
a top-frame-body; and
a top-frame-aperture;
a bottom-frame comprising;
a bottom-frame-body;
a bottom-frame-aperture; and
a plurality of studs;
a geared-socket-hub;
a filter-socket;
a plurality of geared-clamp-jaws comprising;
at least one gripping-finger; and
a geared-clamp-jaw-base;
a filter-gasket; and
a toggle-clamp; and
a drain-attachment assembly comprising;
a drain-attachment-body comprising;
a drain-attachment-base; including
a plurality of keyhole-stud-receivers;
a drain-toggle-clamp;
a drain-nipple; and
a filter-cutter;
wherein said oil filter removal and drain system comprises said oil-filter-removal assembly, and said drain-attachment assembly in functional combination;
wherein said top-frame, said bottom-frame, said geared-socket-hub, and said toggle-clamp are structured and arranged to provide a user with the ability to adjust the orientation of said plurality of geared-clamp-jaws to removably grip a plurality of sizes of oil-filters to aid in removal of said oil-filters by pressing said toggle-clamp to adjust said orientation of said plurality of geared-clamp-jaws;
wherein said filter-socket is structured and arranged to allow said user to removably affix a socket-wrench to said oil-filter-removal assembly to increase torque on said oil-filter during removal of said oil-filter;
wherein each of said geared-clamp-jaws is structured and arranged to grip an outside-surface of said oil-filter;
wherein said drain-attachment assembly is removably affixable to said oil-filter-removal assembly via said plurality keyhole-stud-receivers of said drain-attachment assembly accepting and retaining said plurality of studs of said oil-filter-removal assembly;
wherein each of said bottom-frame-aperture and said top-frame-aperture are structured and arranged to allow said filter-cutter to pass through said oil-filter-removal assembly to contact said oil-filter;
wherein said oil-filter-removal assembly is structured and arranged to be adjustably affixable to said oil-filter such that a user may remove said oil-filter from an engine;
wherein said drain-attachment is structured and arranged to puncture said oil-filter via said filter-cutter providing said user with an ability to drain oil from said oil-filter prior to removing said oil-filter from said engine;
wherein said toggle-clamp includes an adjustment-screw to provide for a more fine adjustment of said oil-filter-removal assembly to accommodate said plurality of sizes of oil-filters;
wherein oil filter removal and drain system further comprises a drain-tube removably affixable to said drain-nipple of said drain-attachment assembly to controllably direct said oil from said oil-filter into an oil-vessel;
wherein said drain-nipple is removable and replaceable such that said user may replace said drain-nipple with one of a different size to accommodate multiple sizes of said drain-tube;
wherein said drain-tube comprises a tubing-clamp structured and arranged to allow said user to selectively stop a flow of oil through said drain-tube;
wherein each of said gripping-fingers of each of said plurality of geared-clamp-jaws further include a textured surface to increase grippability between said oil-filter-removal assembly and said oil-filter;
wherein said filter-socket includes a filter-socket-seal to prevent leakage of oil from between said drain-attachment assembly and said oil-filter-removal assembly during use; and
wherein said filter-cutter is constructed from a hardened-material.

17. A method of using an oil filter removal and drain system comprising the steps of:
providing an oil filter removal and drain system comprising;
an oil-filter-removal assembly comprising;
a top-frame comprising;
a top-frame-body; and
a top-frame-aperture;
a bottom-frame comprising;
a bottom-frame-body;
a bottom-frame-aperture; and
a plurality of studs;
a geared-socket-hub;
a filter-socket;
a plurality of geared-clamp-jaws comprising;
at least one gripping-finger; and
a geared-clamp-jaw-base;
a filter-gasket; and
a toggle-clamp; and
a drain-attachment assembly comprising;
a drain-attachment-body comprising;
a drain-attachment-base; including
a plurality of keyhole-stud-receivers;
a drain-toggle-clamp;
a drain-nipple; and
a filter-cutter;

wherein said oil filter removal and drain system comprises said oil-filter-removal assembly, and said drain-attachment assembly in functional combination;

wherein said top-frame, said bottom-frame, said geared-socket-hub, and said toggle-clamp are structured and arranged to provide a user with the ability to adjust the orientation of said plurality of geared-clamp-jaws to removably grip a plurality of sizes of oil-filters to aid in removal of said oil-filters by pressing said toggle-clamp to adjust said orientation of said plurality of geared-clamp-jaws;

wherein said filter-socket is structured and arranged to allow said user to removably affix a socket-wrench to said oil-filter-removal assembly to increase torque on said oil-filter during removal of said oil-filter;

wherein each of said geared-clamp-jaws is structured and arranged to grip an outside-surface of said oil-filter;

wherein said drain-attachment assembly is removably affixable to said oil-filter removal assembly via said plurality keyhole-stud-receivers of said drain-attachment assembly accepting and retaining said plurality of keyhole-studs of said oil-filter removal assembly;

wherein each of said bottom-frame-aperture and said top-frame-aperture are structured and arranged to allow said filter-cutter to pass through said oil-filter-removal assembly to contact said oil-filter;

wherein said oil-filter-removal assembly is structured and arranged to be adjustably affixable to said oil-filter such that a user may remove said oil-filter from an engine; and wherein said drain-attachment is structured and arranged to puncture said oil-filter via said filter-cutter providing said user with an ability to drain oil from said oil-filter prior to removing said oil-filter horn said engines providing a replacement-oil-filter for an engine;

adjusting said oil-filter-removal assembly to affix to said replacement oil-filter;

draining oil from said engine;

placing said oil-filter-removal assembly upon an oil-filter of said engine;

pressing a toggle-clamp of said oil-filter-removal assembly to secure said oil-filter-removal assembly to said oil-filter of said engine;

loosening said oil-filter of said engine by affixing a socket-wrench to said oil-filter-removal assembly and rotating said oil-filter-removal assembly;

affixing a drain-attachment assembly to said oil-filter-removal assembly and a drain-tube to said drain-attachment assembly;

pressing a drain-toggle-clamp of said drain-attachment assembly;

opening said tubing-clamp; and directing oil draining from said oil-filter into a oil-vessel via said drain-tube.

18. The method of claim 17 further comprising the steps of removing said drain-attachment assembly from said oil-filter-removal assembly;

removing said oil-filter-removal assembly from said oil-filter of said engine;

removing said oil-filter from said engine.

\* \* \* \* \*